United States Patent [19]

Flor et al.

[11] Patent Number: 5,031,065
[45] Date of Patent: Jul. 9, 1991

[54] CARRIER WITH TAPE CONNECTOR INTERLOCK FOR VIDEOCASSETTE

[75] Inventors: Lawrence A. Flor, Anoka; Thomas A. Turgeon, Fridley; Thomas J. Zohn, Woodbury, all of Minn.

[73] Assignee: Minnesota Mining and Manufacturing Company, St. Paul, Minn.

[21] Appl. No.: 381,159

[22] Filed: Jul. 17, 1989

[51] Int. Cl.⁵ .............................................. G11B 23/02
[52] U.S. Cl. ..................................... 360/132; 242/195
[58] Field of Search ................ 360/132, 128, 94, 95; 242/195, 198; 352/72, 78 R, 158

[56] References Cited

U.S. PATENT DOCUMENTS

| | | |
|---|---|---|
| 3,066,880 | 9/1959 | Bauer . |
| 3,104,843 | 9/1963 | Missriegler et al. . |
| 3,105,645 | 10/1963 | Rost . |
| 3,150,840 | 9/1964 | Briskin et al. . |
| 3,188,091 | 6/1965 | Goodell . |
| 3,197,150 | 7/1965 | Camras . |
| 3,227,387 | 1/1966 | Laa et al. . |
| 3,559,918 | 2/1971 | Braun . |
| 3,672,603 | 6/1989 | Swain . |
| 3,783,200 | 1/1974 | Jantzen et al. . |
| 3,882,542 | 5/1975 | Nakamichi . |
| 3,900,171 | 8/1975 | Serizawa . |
| 3,913,145 | 10/1975 | Wiig . |
| 3,941,333 | 3/1976 | Carpenter et al. . |
| 4,091,426 | 5/1978 | Umeda . |
| 4,173,319 | 11/1979 | Umeda . |
| 4,196,873 | 4/1980 | Kudoh . |
| 4,309,002 | 1/1982 | Saitou et al. . |
| 4,358,070 | 11/1982 | Okamura et al. . |
| 4,368,860 | 1/1983 | Goto . |
| 4,402,406 | 6/1984 | Richard . |
| 4,426,047 | 1/1984 | Richard et al. . |
| 4,449,676 | 5/1984 | Ogata et al. . |
| 4,555,077 | 11/1985 | Platter et al. . |
| 4,572,460 | 2/1986 | Hertrich . |
| 4,622,605 | 11/1986 | Tsuroka . |
| 4,920,436 | 4/1990 | Novak . |

Primary Examiner—A. J. Heinz
Attorney, Agent, or Firm—Merchant, Gould, Smith, Edell, Welter & Schmidt

[57] ABSTRACT

A removable tape cartridge (14) for insertion into a carrier (12) in order to form a two-piece videocassette (10) comprises a housing (30) with a tape reel assembly (32) therein. The tape reel assembly (32) includes a length of tape (64) with a connector (68) at one end which, upon insertion of the cartridge (14), mates with an associated connector (16) in the carrier (12) to establish connection with a take-up reel (20). The tape reel assembly (32) is normally biased downwardly by a spring (56) and is normally constrained against rotation by an internal brake assembly (70-74) responsive to insertion of the cartridge (14) into the carrier (12). The tape connector (68) is releasably secured in proper position for mating engagement with the corresponding connector (16) by one end of an arm (78), the other end of which functions to interlock the tape cartridge (14) and carrier (12) against separation upon withdrawal of the tape.

7 Claims, 5 Drawing Sheets

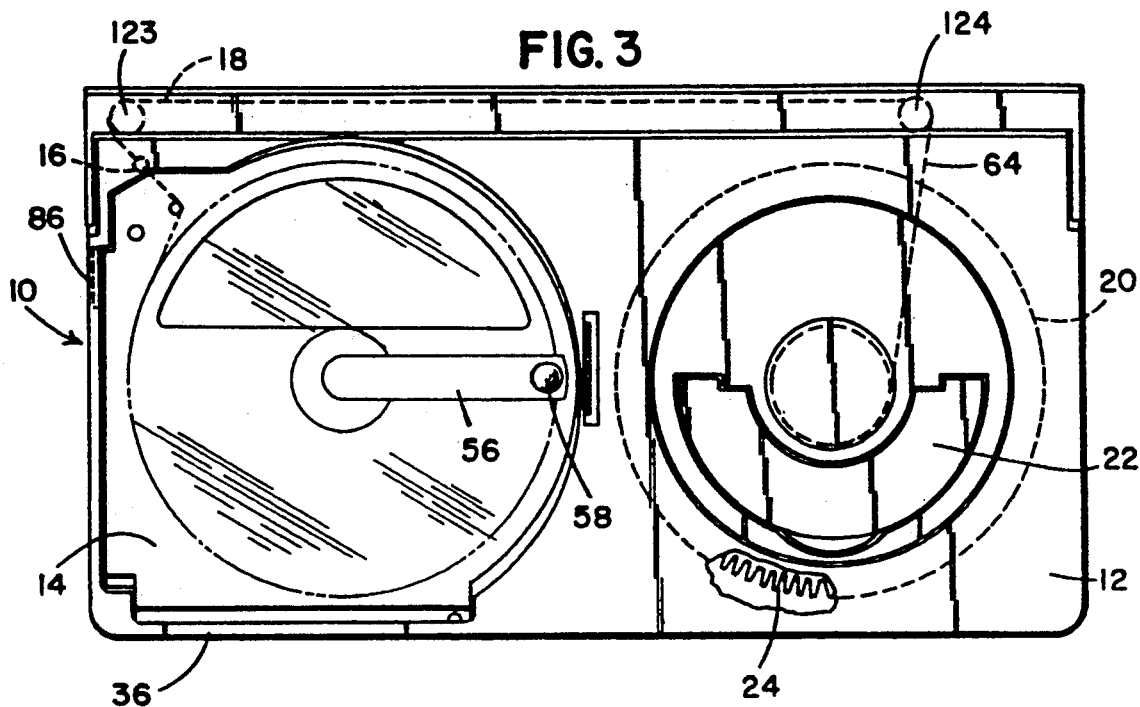
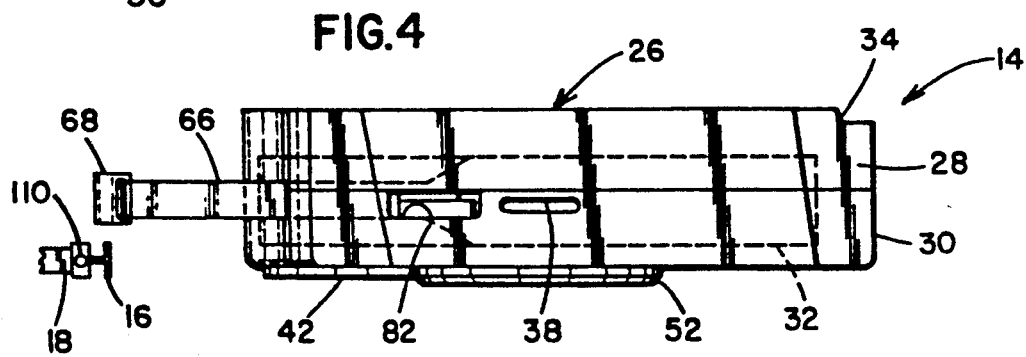
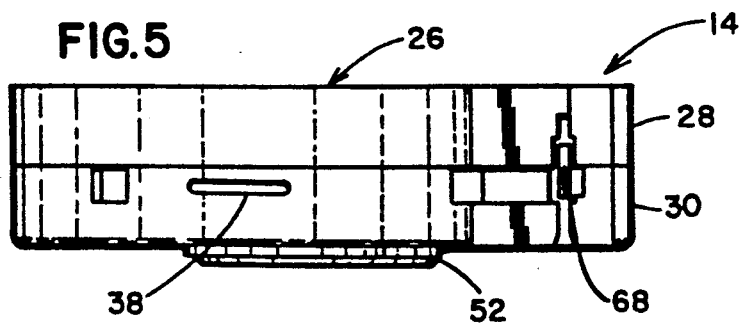
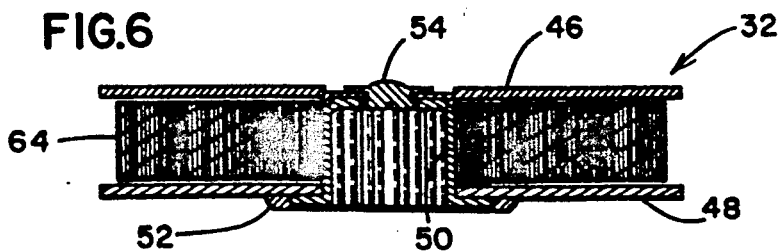

CARRIER WITH TAPE CONNECTOR INTERLOCK FOR VIDEOCASSETTE

TECHNICAL FIELD

The present invention relates generally to magnetic tape cartridges. More particularly, this invention concerns a compact tape cartridge for use with a carrier which may be used to form a two-piece videocassette for use with existing videocassette recorders.

BACKGROUND ART

Videocassette players and recorders (VCRs) have been quite popular and their popularity is expected to continue increasing. One of the reasons for this popularity is the wide variety of programming which is available, either by direct recording for playback and personal use later, or by purchase or rental of prerecorded videocassette. Such videocassettes are generally available in standardized formats, with the VHS format currently being the most popular. The videocassette itself generally consists of a closed housing having a length of tape connected at its ends to a pair of reels therein between which the tape is wound or unwound during play or rewind as the case may be. The tape is generally guided between the reels along a tape path extending along the front edge of the cassette for interaction with a tape head within the VCR, and a pivotal door is usually provided o that edge for protecting the exposed tape before the videocassette has been inserted into the VCR.

Conventional videocassettes are not particularly bulky. However, the available storage space is usually limited and so their storage can become a problem as one's collection of videocassettes increases. This problem is expected to worsen with increasing popularity of VCRs and the consequential increasing size of videocassette libraries used with them. As this occurs, we expect that the available space for storage of the videocassettes will at some point have the practical effect of limiting the number of videocassettes which can be kept and used.

Videocassette adapters are available for adapting relatively small cassettes for use with standard formats. Such adapters generally consist of a housing into which the small cassette can be inserted, for example, through a releasable top door. After insertion, a mechanism in the adapter is manually activated to pull the tape out from the supply and take-up reels in the cassette to which it is connected, and guide the tape along the proper path for playback or recording upon insertion of the adapter into the VCR. Such adapters are typically used with small cassettes used in camcorders, but have limited tape capacity and playing time. For example, the small cassettes used with such adapters typically have a maximum playing time of only about twenty minutes versus up to about 2-6 hours (depending upon speed) available with a standard size videocassette. U.S. Pat. Nos. 3,677,494 to Protas, 4,432,510 to Ogata, 4,504,876 to Nagaoka, and 4,567,536 to Tsuchiya are representative of the prior art in this regard. Such adapters do not address the problem of achieving more efficient tape storage without sacrificing capacity and playing time.

The need has thus arisen for a compact tape cartridge which provides the same or better capacity when inserted into a carrier in order to form a standard a videocassette, but which makes for better use of available storage when removed from the carrier.

SUMMARY OF INVENTION

The present invention comprises an insertable tape cartridge which overcomes the foregoing and other difficulties associated with the prior art. In accordance with the invention, there is provided a tape cartridge for use with a carrier having a take-up reel therein in order to form a two-piece videocassette which can then be used in the usual fashion, except that multiple such tape cartridges can be stored in the same available space while requiring only one such carrier. The tape cartridge herein provides the same tape capacity, but requires only half the storage space of a standard videocassette.

The tape cartridge includes a housing containing a supply reel assembly. The supply reel stores the magnetic tape. The end of the tape is anchored to the hub of the supply reel assembly. The other end of the tape is attached to a tape connector. This tape connector is retained in an opening of the cartridge housing. Another cooperating tether connector is connected to a tether or leader. The tether itself is connected to a take-up reel in the carrier. Locating surfaces on the housing position the tape cartridge during insertion. The insertion of the cartridge into the carrier completes the tape-tether interconnection on the supply reel side of the carrier.

An interlock mechanism is provided for preventing the tape-tether interconnection from exiting the take up side of the carrier while the tape access door is open.

BRIEF DESCRIPTION OF THE DRAWINGS

A better understanding of the invention can be had by reference to the following Detailed Description in conjunction with the accompanying Drawings, wherein:

FIG. 3 is top view of the two-piece videocassette with the tape cartridge inserted therein;

FIG. 4 is side view of the tape cartridge;

FIG. 5 is front view of the tape cartridge;

FIG. 6 is cross-sectional view of the tape reel assembly;

DETAILED DESCRIPTION

Figure 1:
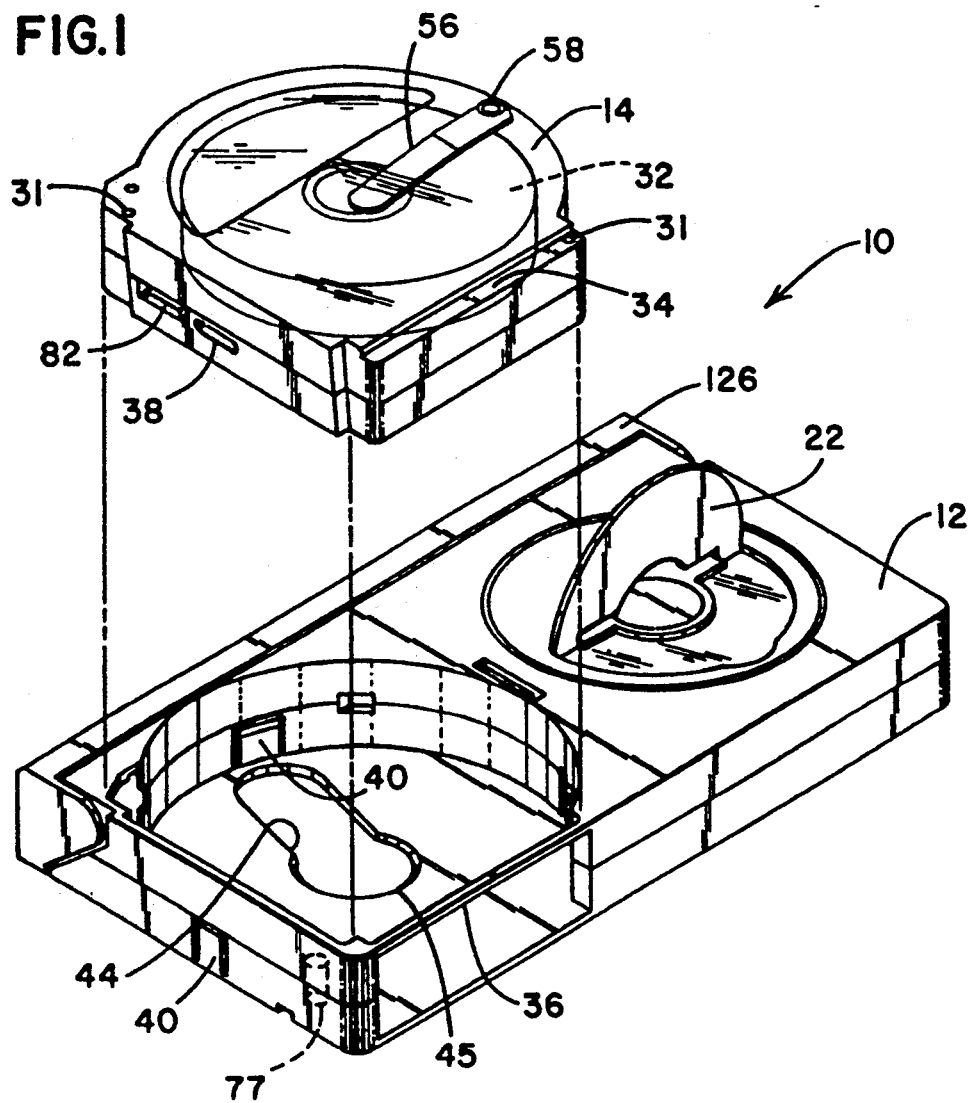
FIG. 1 is an exploded perspective view of a two-piece videocassette incorporating the tape cartridge of the invention.
Figure 2:
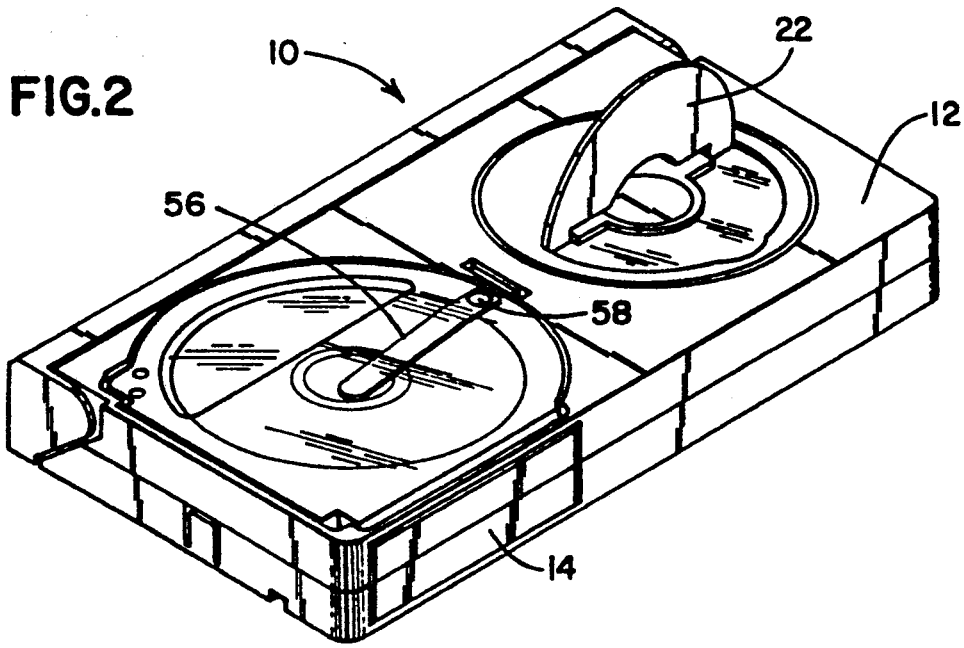
FIG. 2 is a perspective view of the two-piece videocassette with the tape cartridge inserted therein.

Referring now to the Drawings, wherein like reference numerals designate like or corresponding elements throughout the views, and particularly referring to FIGS. 1-3, there is shown a two-piece videocassette 10 comprising a carrier 12 and a removable tape cartridge 14 incorporating the invention. The carrier 12 includes a connector 16 secured to one end of a tether 18 which is attached at its other end to a take-up reel 20 to which the tape from cartridge 14 can be connected for winding or unwinding in response to manual actuation of a self-contained wind key which includes a thumb tab 22. FIGS. 1 and 2 show the tab 22 in the up position for winding. The tab 22 is connected to a drive gear 24 which is engageable through a set of drive gears with the tape cartridge 14, after insertion into carrier 12 and completion of the tape connection, so that rotation of the tab advances the tape connectors toward the take-up reel 20 and establishes the proper tape path within the carrier for playback or recording. This tape path is illustrated in FIG. 3 by the passage of tape 64 over guidepost 123 and guidepost 124.

Referring now to FIGS. 4-6, the tape cartridge 14 includes a housing 26 consisting of a top cover 28 and a bottom cover 30 secured together by suitable screws. The top cover 28 preferably includes a substantially clear or transparent portion 98 so that the tape reel assembly 32 can be seen inside the housing therein. The housing 26 can be formed of any suitable material, such as plastic.

The tape cartridge 14 includes locating structure to assure proper orientation thereof upon insertion into carrier 12. In particular, the housing 26 is of non-symmetrical configuration for alignment with an opening of similar shape in the top surface of carrier 12. As shown, the tape carrier 14 includes two adjacent straight sides bounded by a curved side. A ledge or notch 34 is provided along the upper edge of one of the straight sides of cartridge 14 for receipt underneath a cross member 36 on carrier 12 in order to retain the cartridge. A plurality of recesses 38 are also provided in the other sides of cartridge 14 opposite and adjacent that containing notch 34 for receiving retaining tabs 40, only one of which is shown as best seen in FIG. 1, within the carrier 12. The bottom housing cover 30 also includes an offset raised member 42 which is adapted for flush receipt in the offset portion of hole 44 in the bottom of the carrier 12.

It will thus be appreciated that the cartridge 14 is inserted into carrier 12 by first tilting it in order to place the end with notch 34 under the brace or cross member 36 and then pushing it downward completely into the carrier. The cartridge 14 is removed simply by inserting a finger through the offset portion of hole 44 and pushing the end opposite notch 34 upwardly to disengage the remaining tabs 40.

Figure 7:
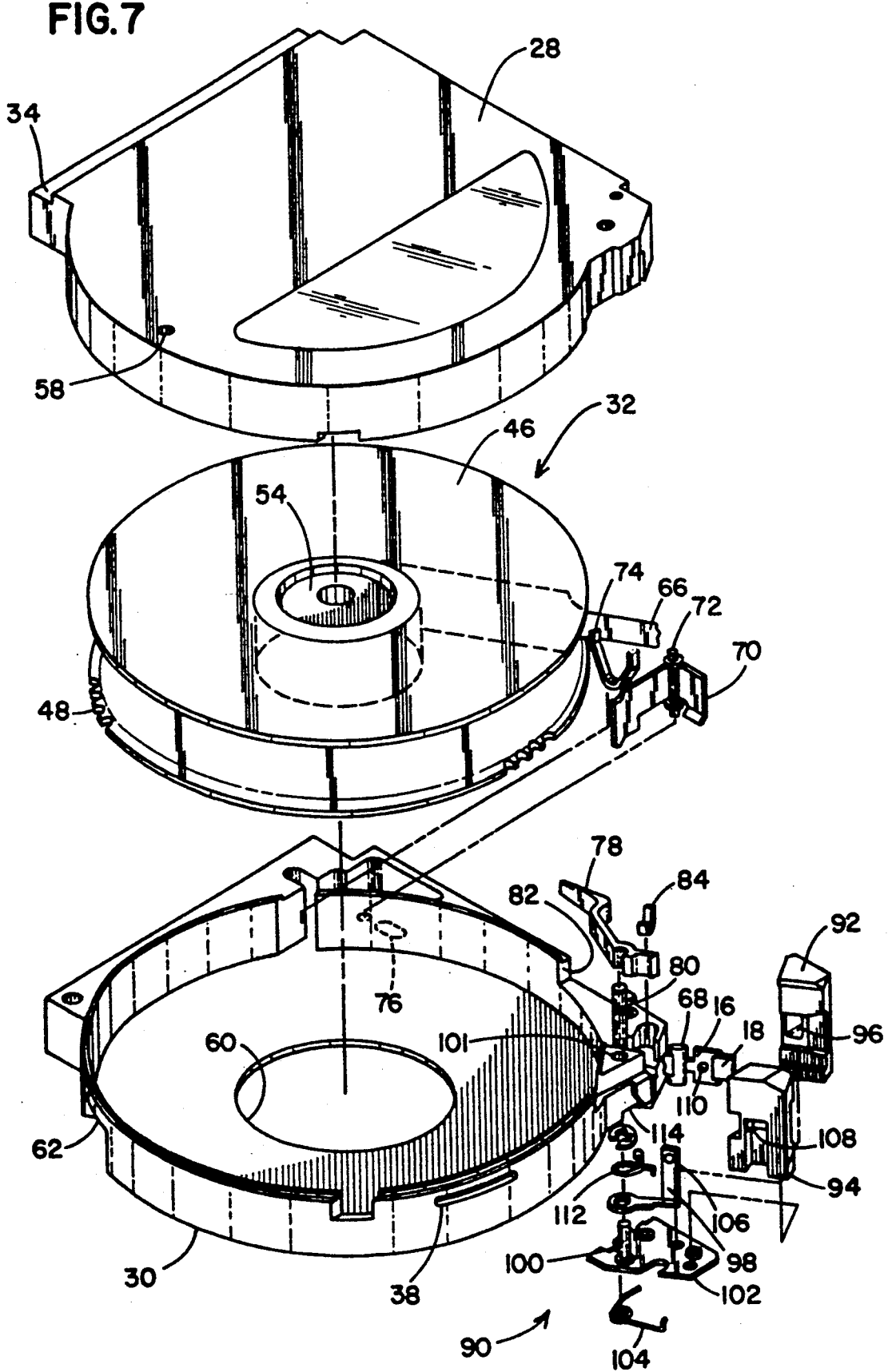
FIG. 7 is exploded view of the tape cartridge.

Referring now to FIGS. 6 and 7, the tape reel assembly 32 include a top flange 46 and a bottom gear flange 48. The bottom gear flange 48 includes a central hub 50 which is fixed or preferably integral therewith for rotation in unison. The inside of hub 50 is preferably splined, as is best seen in FIG. 6, for engagement with a drive spindle (not shown) through center holes in the bottom gear flange 48 and bottom cover 30 when the tape cartridge 14 is inserted into the carrier 12 and the carrier has been inserted into the videocassette recorder and lowered into play position. A beveled collar 52 is preferably provided about the underside of hub 50 for cooperation with a beveled central portion of hole 45 in the bottom of the carrier 12, as seen in FIG. 1, for proper alignment with the drive spindle. The top flange 46 is secured onto hub 50 by means of a snap button 54. Serrations are provided on the surfaces of mating flange 46 and hub 50 so that the top flange cannot turn relative to the hub and bottom gear flange 48.

The tape reel assembly 32 is normally urged downwardly within cartridge 14 by a curved leaf spring 56, one end of which bears against button 54 and the other end of which is secured by a heat stake or other suitable connector 58 to the top cover 28. The bottom gear flange 48 thus normally bears against the inside of the bottom cover 30, with collar 52 loosely received within a relatively larger central opening 60 therein so that the hub 50 can be accessed by the drive spindle through hole 45 in the bottom of the carrier 12.

It will thus be appreciated that the tape reel assembly 32 is capable of same limited "floating" movement within the cartridge 14, but is normally urged by spring 56 toward the down position against the bottom housing cover 30. A radial access opening 62 is provided along one side of the cartridge housing 30, as best seen in FIG. 7, so that the tape reel assembly 32 can be driven via a gear (not shown) which is engageable with the bottom gear flange 48 responsive to winding actuation of tab 22 in order to advance the tape from cartridge 14 to the take-up reel 20 within carrier 12 after insertion of the cartridge into the carrier but before insertion of the two-piece videocassette 10 into the recorder.

The tape reel assembly 32 further includes a length of magnetic tape 64 wound around hub 50 between the top and bottom flanges 46 and 48. The length of magnetic tape 64 preferably includes a substantially clear or transparent leader 66 spliced in conventional fashion at each end thereof. For purposes of illustration, only the leader 66 at the outer end has been shown, however, it will be understood that another leader is spliced to the inner end of the tape which in turn is secured at its free end to hub 50 by means of a clip (not shown) or other suitable fastener. The leader 66 at the outer end of tape 64 is secured at its free end to a tape connector 68, which is adapted for mating engagement with the corresponding tether connector 16 in carrier 12 upon insertion of the tape cartridge 14. As illustrated, the tape connector 68 and tether connector 16 comprise mating male and female portions which engage upon insertion of the tape cartridge 14 into the carrier 12.

In accordance with the preferred construction, the leader 66 on the outer end of the magnetic tape 64 transitions to an outer portion of reduced predetermined width which is also of predetermined length for winding receipt onto a reduced portion of the take-up reel 20 in the carrier 12 so that the mating connectors 16 and 68 will be positioned flush with a relatively wider diameter portion (not shown) of the take-up reel in order to avoid undesirable impressions in tape 64. The transparent leader on the inner end of tape 64 is of the same uniform width as the tape.

Figure 8:
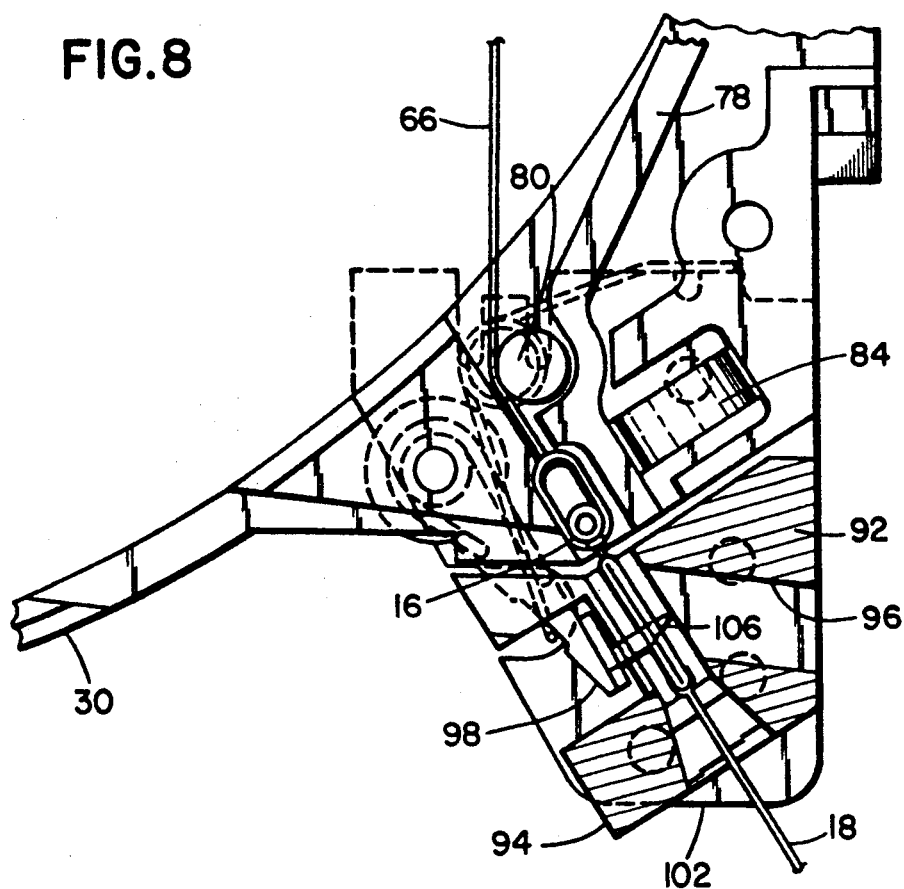
FIG. 8 is a cross-sectional view of the tape illustrating the retention of the connector.
Figure 9:
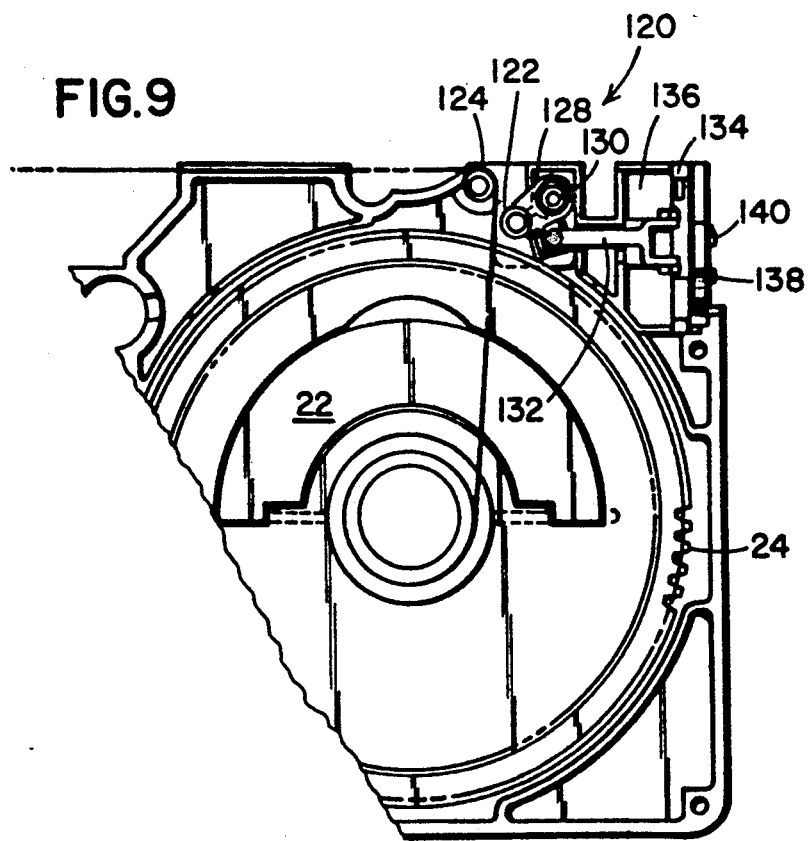
FIG. 9 is a cross-sectional view of the carrier illustrating the interlock mechanisms.

Referring now to FIGS. 7-9, the tape cartridge 14 preferably includes an internal brake mechanism which normally secures the tape reel assembly 32 against unwinding movement unless properly inserted into carrier 12. In particular, a brake lever 70 is mounted for pivotal movement about a post 72 within a cavity in the bottom housing 30. One end of the brake lever 70 is normally urged by a spring 74 through an access opening and into locking engagement with the bottom gear flange 48, as best seen in FIG. 7. The other end of the brake lever 70 is turned outwardly and positioned over an access hole 76 in the bottom housing cover 30. When the tape cartridge 14 is inserted into carrier 12, pin 77 on the inside bottom of the carrier cam-actuates the brake lever 70 through hole 76 in order to release the tape reel assembly 32, as best seen in FIG. 7, so that it can turn freely in either direction in order that tape 64 can be freely wound or unwound from the tape cartridge as desired.

It will thus be appreciated that the brake mechanism releases the tape reel assembly 32 responsive to insertion of the cartridge 14 into carrier 12. This comprises another important feature of the present invention.

In addition to an internal brake mechanism, the tape cartridge 14 includes a tape connector/carrier interlock mechanism which functions to releasably retain the tape connector 68 in a predetermined fixed position in housing 26 for mating engagement with the connector 16 upon insertion into carrier 12, and which also functions to effect a positive mechanical interlock between the tape cartridge and carrier after the tape connection has been established and connector 68 has been drawn out of housing 30. In particular, referring again to FIGS. 7-9, a horizontal arm 78 is supported for pivotal or rocking movement about one side of a guide pin 80, the other side of which adjoins a through passageway defining the tape path into and out of tape cartridge 14. One end of the arm 78 is movable into and out of the tape path, while the other end of the arm is movable through a slot 82 in the cartridge housing 26. As is best seen in FIG. 8, the arm 78 is normally biased by spring 84 such that one end holds the tape connector 68 in releasable clamped engagement within the tape guideway, while the other end of the arm is recessed within notch 82. This is necessary to constrain the female tape connector 68 against displacement as it fits down over the male tape connector 16 in the carrier 12. After the tape cartridge 14 has been inserted into carrier 12, with tape connectors 16 and 68 in mating engagement, then withdrawal of the connector 68 from the guideway releases arm 78 so that spring 84 can actuate the other end of the arm outwardly into locking engagement with a notch 86 in the carrier. The arm 78 and associated surrounding notch 82 are preferably configured to come into stopping engagement to prevent the other end of the arm from moving too far across the tape path and interfering with movement of tape 64. This comprises another important feature of the present invention.

Referring now to FIGS. 7 and 8, the carrier 12 preferably includes a tether connector interlock 90 associated with the carrier. In particular, the interlock 90 consists of a pair of support blocks 92 and 94 defining a stepped, tapered guide slot therebetween for tape connector 16 and tether connector 68, leaders 18 and 66, and tape 64. The support block 92 includes a hole 96 for optically sensing the "end tape" on passage of one of the leaders to clear the path. The tape connector 16 is normally releasably secured in fixed position over the hole 96 in support block 92 by means of an arm 98 which is pivotally supported on a pin 100 on a plate 102 secured to the bottom of carrier 12 adjacent the support block 94 and opposite the support block 92. The arm 98 is normally biased toward the support block 94 by means of spring 104. The upper end of arm 98 includes a point or nose key shaped 106, as best seen in FIG. 8, which extends through an opening 108 in the support block 94 into pinned engagement with a key hole 110 and tether connector 68 in order to secure it in fixed position for engagement with the tape connector 16 upon insertion of the tape cartridge 14 into carrier 12. A small wire form 112 is also supported on the pin 100. One end of the wire form bears against the arm 98, while the other end extends upwardly for engagement with a cam surface 114 upon insertion of the tape cartridge 14 into carrier 12.

It will thus be appreciated that the connector 16 is normally releasably secured (preferably by pinned engagement) within the cartridge by arm 78 for engagement with the connector 68 responsive to insertion of the tape cartridge 14 into carrier 12. As the tape cartridge 14 is inserted, the connector 16 is held in place until engagement with connector 68 in order to establish the tape tether interconnection. The wire form 112 and cam surface 114 are configured so that the arm 98 is moved away from support block 94 only after the tape connection has been established, when the tape cartridge 14 is almost completely inserted flush with the carrier 12. Any movement of tape 66 along the tape path is thus blocked until after completion of the tape connection and full insertion of the tape cartridge 14 into carrier 12. This comprises another important feature of the present invention.

As previously described, the tape on the supply reel 32 must mate with the tether to permit the tape to be wound onto the take-up spool 20. It is important that this connection be made in a reliable fashion even after the cartridge and carrier have been used extensively. This objective is met by controlling the sequence of engagement by the use of the structures just described. In operation, the ledge 34 of cartridge 14 is engaged with cross brace 36. This layout causes the cartridge to rotate or pivot along the ledge as it is inserted into the carrier 12. The pivoting motion required to seat the cartridge 14 brings the cartridge first, into engagement with the locating pin 100. The plate 102 is used to locate pin 100 and the other elements of the carrier which require accurate alignment for reliable connection. The pin 100 preferably has a blunt or tapered nose to guide the cartridge section. The pin is sized to form a low clearance fit with the aperture 101 on the cartridge 14. Since the pin 100 is the first close tolerance element engaged, it serves to align and restrain the cartridge in the carrier 12. This operation serves to align the male tether connector 16 with the female tape connector 68. FIG. 4 shows the connectors 16 and 68 aligned for engagement while FIG. 7 shows the connector pair fully engaged. During the engagement process the male portion of the connector 16 is held by arm 98 in the opposing support blocks 92 and 94. The keyed aperture formed in the male portion of the interconnector pair also serves to support and align the connector 16. During the engagement process the spring loaded arm 98 carrying key 106 holds the connector against support block 92, and the key 106 cooperates with the hole 110 to orient and align the connector. Once insertion of the male portion of connector 16 into the female portion of connector 68 has occurred, the continued movement of the cartridge down the pin 100 results in the actuation cam 114. The cam surface of cam 114 engages arm 98 and forces the arm to retract, releasing the interconnector assembly. Thus, the tape-tether interconnection is mating freed only after is achieved.

Figure 10:
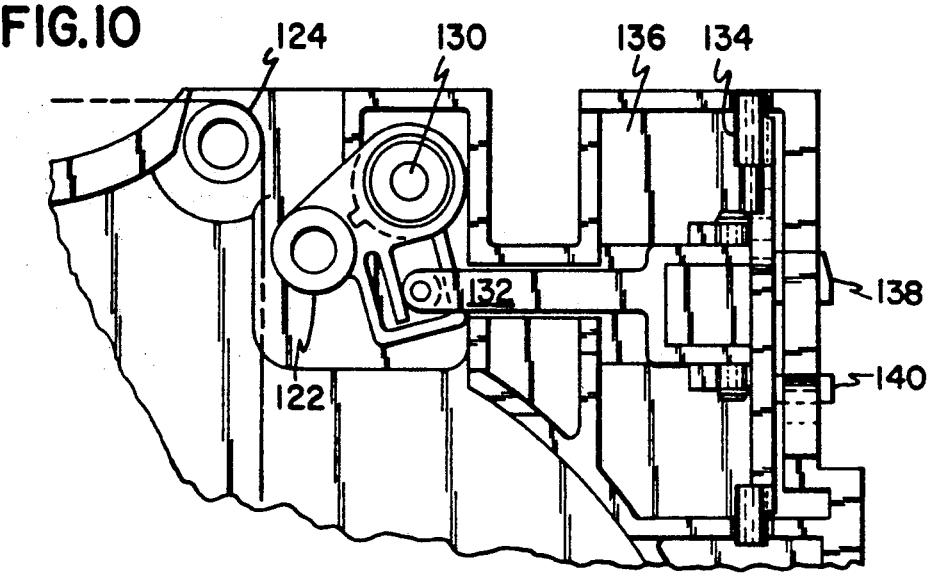
FIG. 10 is a top view of the interlock mechanism with the interlock in the unactivated position.
Figure 11:
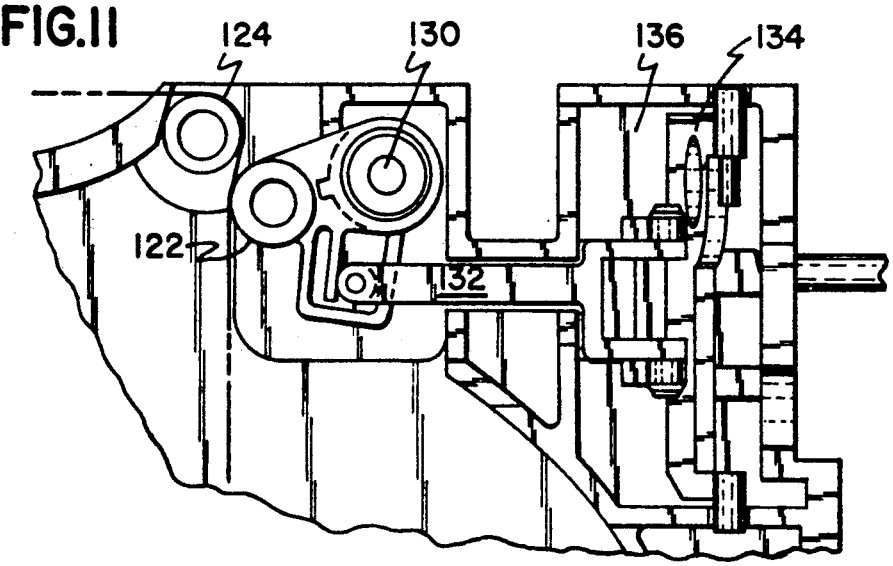
FIG. 11 is a top view of the interlock mechanism with the interlock in the actuated position.

Referring now to FIGS. 9, 10 and 11, the carrier 12 preferably includes an interlock 120 associated with the take-up reel 20. It will be recalled that the first tape connector interlock 90 functions to prevent inadvertent advance of connectors 16 and 68 along the tape path until after the tape connection has been established and the tape cartridge 14 has been fully inserted into carrier 12. This second interlock 120 functions to prevent inadvertent advance of the connectors 16 and 68 back along the tape path from the take-up reel 20 when the two-piece videocassette 10 has been inserted into the recorder and lowered into play position. In particular, a small nip roller 122 is mounted for movement toward and away from a fixed tape guide pin 124 responsive to positioning of the tape door 126. For purposes of clarity, the tape door 126 has been omitted from FIG. 9, 10 and 11. It is shown in FIG. 1, 2, and 3. The nip roller 122 is supported between a pair of vertically spaced apart arms 128 which are pivotally supported on a pin 130. The lower arm 128 includes an offset lug which receives one end of a push rod 132. The other end of the push rod 132 is connected to a depending pivotal member 134 which is normally urged toward one position by a spring 136. The depending pivotal member 134 also includes a push tab 138 which extends outwardly through an opening in the associated sidewall of carrier 12. A door lock tab 140 is also secured to the member 134. After the two-piece videocassette 10 is inserted into a recorder and lowered into play position, a fixed actuator (not shown) therein engages the push tab 134 thus pivoting the member 134 inwardly in order to release the door 126 for opening, and simultaneously moving the nip roller 122 in close proximity with the guidepost 124. This is shown in FIG. 11. The nip is sufficiently small that so that tape-tether the interconnection cannot be rewound from take-up reel 20 along the tape path, which could cause damage to the tape head (not shown). A machine failure which attempted to rewind the interconnection across the heads would result in trapping the interconnection in the nip and breaking the tape. This comprises another important feature of the invention.

Although particular embodiments of the invention have been illustrated in the accompanying Drawings and described in the foregoing Detailed Description, it will be understood that the invention is not limited only to the embodiments disclosed, but is intended to embrace any alternatives, equivalents, modifications and/or rearrangement of elements falling within the scope of the invention as defined by the following claims.

We claim:

1. A two piece videocassette of the type formed by the insertion of a tape cartridge into a cooperating carrier, comprising:
    a supply reel located within said cartridge, for storing tape, said tape having a first tape and having a second tape end, said first tape and being attached to said reel,
    a tape connector attached to said second tape end of said tape,
    a tape cartridge carrier having a housing defining a tape cartridge receiving aperture adapted to receive said tape cartridge,
    a take-up reel located within said tape cartridge carrier, for storing tape,
    guidepost means attached to said housing and located within said tape cartridge carrier for defining a tape path within said tape cartridge carrier,
    a tether having a first tether end and a second tether end, said first tether end being attached to said take-up reel and extending along said tape path,
    a tether connector attached to said second tether end of said tether,
    a tether connector lock means adapted for activation by said tape cartridge, for securing said tether connector in a fixed position for mating engagement with said tape connector at a position along said tape path proximate said tape cartridge receiving aperture when said cartridge carrier is not inserted into said tape cartridge carrier, and for releasing said tether connector upon the insertion said tape cartridge into said carrier.

2. The two piece videocassette of claim 1 further comprising:
    a tape cartridge guide pin located within said tape cartridge carrier housing proximate said tether connector lock means,
    a tape cartridge guide pin aperture formed in said tape cartridge proximate said tape connector for engaging said tape cartridge guide pin, whereby said tether connector is aligned for mating engagement with said tape connector forming a tape-tether interconnection when said tape cartridge is in engagement with said tape cartridge guide pin.

3. The two piece videocassette of claim 1 further comprising:
    a tape carrier tape path access door mounted on said tape carrier adjacent said tape path,
    door interlock means actuated by said tape path access door for preventing movement of said tape-tether interconnection along said tape path when said tape path access door is open.

4. The two piece viedeocassette of claim 1 further comprising:
    a tape carrier tape path access door mounted on said tape carrier adjacent said tape path,
    door interlock means actuated by said tape path access door for permitting movement of said tape-tether interconnection along said tape path when said tape path access is closed.

5. The two piece videocassette of claim 1 further comprising:
    a tape carrier tape path access door mounted on said tape carrier adjacent said tape path,
    door interlock means actuated by said door for permitting movement of said tape-tether interconnection along said tape path when said door is closed and for preventing movement of said tape-tether interconnection along said tape path when said door is open.

6. The two piece videocassette of claim 5 wherein said door interlock means comprises:
    a nip roller mounted in said tape carrier for pivotal engagement with said guide post and actuated by said door, whereby a nip is formed between said guidepost means and said nip roller, along said tape path, when said door is opened and said nip roller is pivoted out of said tape path when said door is closed.

7. A method of forming a tape-tether interconnection between a tape cartridge having a tape connector and a carrier having a tether connector comprising the steps of:
    inserting said tape cartridge into said carrier;
    engaging a locating pin on said carrier with a guide pin aperture on said cartridge;
    moving said tape cartridge in a direction defined by said pin whereby said tape connector and said tether connector are aligned;
    holding said tape connector in a fixed position to assist alignment of said tape connector with said tether connector
    inserting said tape connector into said tether connector, whereby said tape connector engages said tether connector, forming a tape-tether interconnection;
    seating said cartridge in said carrier to activate a release of said tape-tether interconnection from said fixed position.

* * * * *

UNITED STATES PATENT AND TRADEMARK OFFICE
CERTIFICATE OF CORRECTION

PATENT NO. : 5,031,065

DATED : July 9, 1991

INVENTOR(S) : Flor, et al.

It is certified that error appears in the above-identified patent and that said Letters Patent is hereby corrected as shown below:

Col. 1, line 30, "o" should read --on--.
Col. 1, line 68, delete "a" after the word "standard".
Col. 2, Figure 3, Line 43, insert --a-- after the word "is".
Col. 2, Figure 4, line 45, insert --a-- after the word "is".
Col. 2, Figure 5, line 46, insert --a-- after the word "is".
Col. 2, Figure 6, line 47, insert --a-- after the word "is".
Col. 2, Figure 7, line 49, insert --an-- after the word "is".
Col. 3, Line 26, "carrier" should read --cartridge--.
Col. 5, line 56 "shaped" should read --shape--.
Col. 6, line 54, insert --this-- after the word "after".
Col. 7, line 21, "that so that tape-tether the" should read --so that the tape-tether--.
Col. 7, line 22, insert --the-- after the word "from"
Col. 7, line 42, claim 1, insert --end-- after the word "tape" (sec. occur).
Col. 7, line 43, claim 1, "and" should read --end--.
Col. 7, line 67, claim 1, insert --of-- after the word "insertion".
Col. 8, line 21, claim 4, "viedeocassette" should read --videocassette--
Col. 8, line 60, claim 7, insert --;-- after the word "connector".

Signed and Sealed this

Thirty-first Day of December, 1991

Attest:

HARRY F. MANBECK, JR.

*Attesting Officer*     Commissioner of Patents and Trademarks